United States Patent
Ohsawa et al.

(10) Patent No.: US 11,837,932 B2
(45) Date of Patent: Dec. 5, 2023

(54) STATOR, MOTOR, AND COMPRESSOR

(71) Applicant: DAIKIN INDUSTRIES, LTD., Osaka (JP)

(72) Inventors: Yasuhiko Ohsawa, Osaka (JP);
Yoshihiro Kataoka, Osaka (JP);
Satoshi Tsukamoto, Osaka (JP);
Yoshitomo Tsuka, Osaka (JP); Ryouta Nakai, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/100,405

(22) Filed: Jan. 23, 2023

(65) Prior Publication Data
US 2023/0155442 A1 May 18, 2023

Related U.S. Application Data

(63) Continuation of application No. PCT/JP2021/018660, filed on May 17, 2021.

(30) Foreign Application Priority Data
Jul. 28, 2020 (JP) .................................. 2020-127325

(51) Int. Cl.
*H02K 3/52* (2006.01)
*H02K 3/50* (2006.01)
(Continued)

(52) U.S. Cl.
CPC ........... *H02K 3/345* (2013.01); *F25B 31/026* (2013.01); *H02K 3/50* (2013.01); *H02K 3/52* (2013.01);
(Continued)

(58) Field of Classification Search
CPC .......... H02K 5/22; H02K 5/225; H02K 3/522; H02K 2203/12; H02K 3/34; H02K 3/345; H02K 3/50; H02K 3/52; F25B 31/026
(Continued)

(56) References Cited

U.S. PATENT DOCUMENTS 11,271,448 B2 * 3/2022 Uchise .................. H02K 15/10
2008/0054737 A1 * 3/2008 Inayama ................ H02K 1/148
310/44

(Continued)

FOREIGN PATENT DOCUMENTS

CN 1860660 A 11/2006
CN 107534345 A 1/2018
(Continued)

OTHER PUBLICATIONS

Shimodaira et al, Stator, Motor Compressor and Method for Manufacturing Stator, Apr. 4, 2019, WO 2019065141 (English Machine Translation) (Year: 2019).*

(Continued)

*Primary Examiner* — Alexander A Singh
(74) *Attorney, Agent, or Firm* — Global IP Counselors, LLP

(57) ABSTRACT

A stator includes a stator core having a plurality of teeth, an insulator, a plurality of coils, a first region in which distal ends of feeder lines are connected to each other, and a second region in which distal ends of neutral lines are connected to each other. The insulator has inner and outer walls spaced from each other in a radial direction. In a cross section at a gap between two adjacent coils, along a plane including an axis of the stator core, a center of gravity of the first region is positioned above a center of gravity of the second region in an axial direction. B<A and C<A, where a radial length of the first region is B, a radial length of the (Continued)

second region is C, and a radial length between the inner wall and the outer wall of the insulator is A.

7 Claims, 9 Drawing Sheets

(51) Int. Cl.
 *H02K 3/34* (2006.01)
 *F25B 31/02* (2006.01)
(52) U.S. Cl.
 CPC ......... *H02K 3/522* (2013.01); *H02K 2203/12* (2013.01)
(58) Field of Classification Search
 USPC .......................................... 310/214, 215, 71
 See application file for complete search history.

(56) References Cited

U.S. PATENT DOCUMENTS

| | | |
|---|---|---|
| 2009/0102307 A1 | 4/2009 | Amano |
| 2016/0218578 A1 | 7/2016 | Yamada et al. |
| 2018/0131246 A1 | 5/2018 | Shirasaka |
| 2018/0351428 A1 | 12/2018 | Okamoto et al. |
| 2019/0319506 A1 | 10/2019 | Reu |

FOREIGN PATENT DOCUMENTS

| | | | |
|---|---|---|---|
| CN | 110391708 A | 10/2019 | |
| DE | 11 2017 000 703 T5 | 10/2018 | |
| JP | 3824001 B2 | 9/2006 | |
| JP | 2014-195384 A | 10/2014 | |
| JP | 2020-72579 A | 5/2020 | |
| WO | 2011/007881 A1 | 1/2011 | |
| WO | 2015/045949 A1 | 4/2015 | |
| WO | WO-2019065141 A1 * | 4/2019 | ............... H02K 3/46 |

OTHER PUBLICATIONS

International Search Report of corresponding PCT Application No. PCT/JP2021/018660 dated Aug. 3, 2021.

International Preliminary Report of corresponding PCT Application No. PCT/JP2021/18660 dated Feb. 9, 2023.

European Search Report of corresponding EP Application No. 21 84 9142.1 dated Oct. 27, 2023.

* cited by examiner

STATOR, MOTOR, AND COMPRESSOR

CROSS-REFERENCE TO RELATED APPLICATIONS

This is a continuation of International Application No. PCT/JP2021/018660 filed on May 17, 2021, which claims priority to Japanese Patent Application No. 2020-127325, filed on Jul. 28, 2020. The entire disclosures of these applications are incorporated by reference herein.

BACKGROUND

Technical Field

The present disclosure relates to a stator, a motor, and a compressor.

Background Art

A known stator has neutral lines and lead wires fixed to an upper insulator, with the neutral lines and the lead wires not orderly separated from each other and from coils (see, for example, JP 3824001 B2).

When the stator described above is used in a motor disposed in a hermetic container of a compressor, the neutral lines and the lead wires prevent an enough gap from being provided between the coils, so that a cross-sectional area of a passage between the coils through which a refrigerant flows becomes insufficient, causing oil to be discharged along with the refrigerant due to an increase in flow velocity of the refrigerant flowing between the coils, thus escape of oil from the compressor cannot be prevented accordingly.

SUMMARY

The present disclosure proposes a stator capable of preventing oil from escaping, or leaking, through a gap between coils when used in a motor of a compressor.

The present disclosure further provides a motor including the stator.

The present disclosure further provides a compressor including the motor.

A stator of the present disclosure includes a stator core having a plurality of teeth, an insulator mounted to an axial end surface of the stator core, a plurality of coils with each coil wound around a corresponding one of the plurality of teeth of the stator core, a first region in which a distal end of a feeder line extending from a first end of one of the coils is connected to a distal end of a feeder line extending from a first end of an other one of the coils, and a second region in which distal ends of neutral lines extending from second ends of the coils are connected to each other. The insulator has an inner wall and an outer wall spaced from each other in a radial direction of the stator core. Both the first region and the second region are partially disposed axially above the stator core between the inner wall and the outer wall of the insulator. In a cross section at a gap between at least two adjacent coils of the plurality of coils, taken along a plane including an axis of the stator core, a center of gravity of the first region is positioned above a center of gravity of the second region in an axial direction of the stator core. $B<A$ and $C<A$, where a radial length of the first region is B, a radial length of the second region is C, and a radial length between the inner wall and the outer wall of the insulator is A.

A motor of the present disclosure includes the stator, and a rotor disposed radially inside of the stator.

A compressor of the present disclosure includes a hermetic container, a compression mechanism part disposed in the hermetic container, and the motor disposed in the hermetic container and configured to drive the compression mechanism part.

DETAILED DESCRIPTION OF EMBODIMENT(S)

Figure 1:
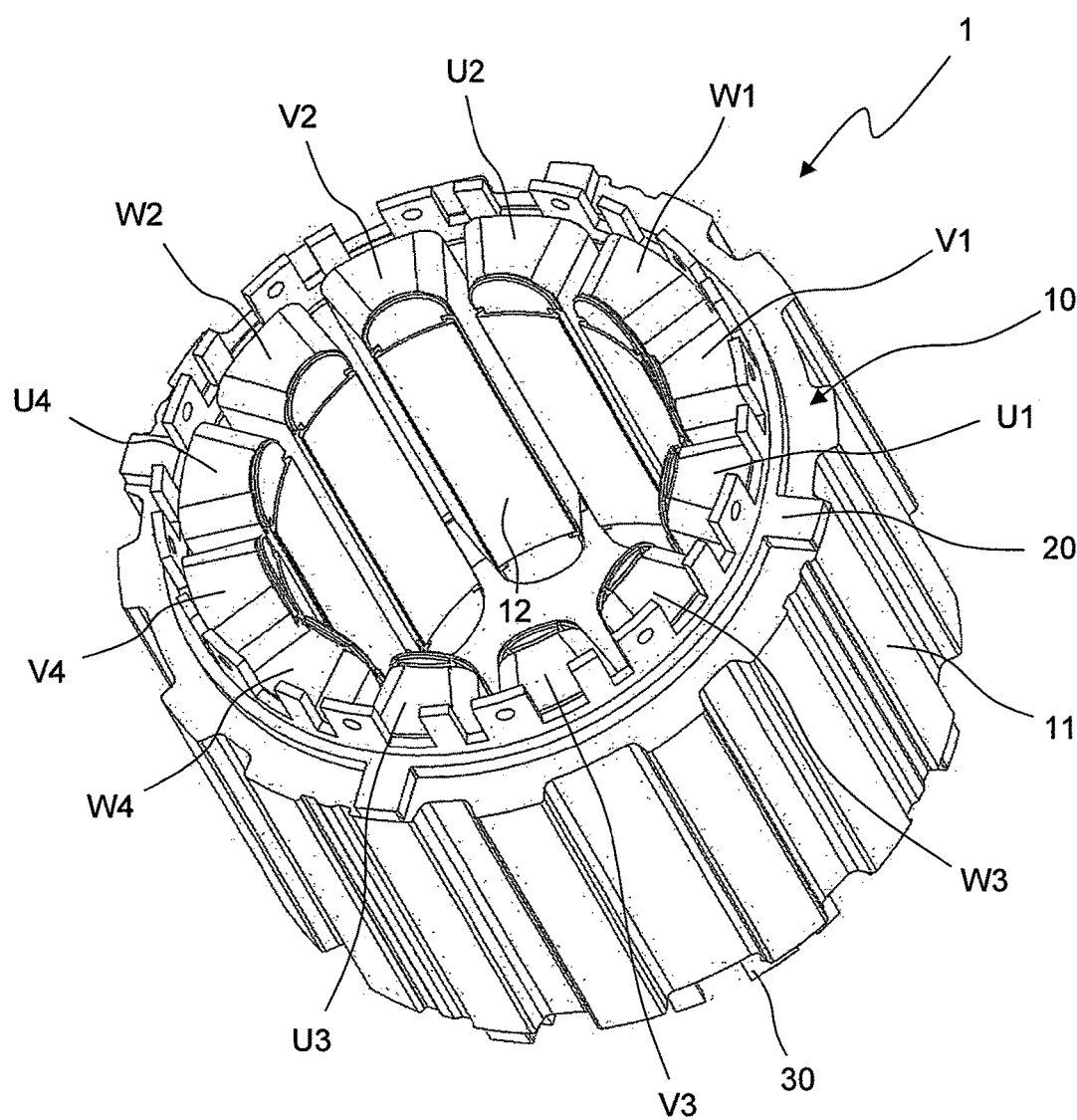
FIG. 1 is a perspective view of a stator of a first embodiment of the present disclosure.

Embodiments will be described below. It should be noted that in the drawings, the same reference numerals represent the same or corresponding parts. In addition, the dimensions on the drawings, such as lengths, widths, thicknesses, and depths, are appropriately changed from actual scales for clarity and simplification of the drawings, and do not represent actual relative dimensions.

First Embodiment

Figure 2:
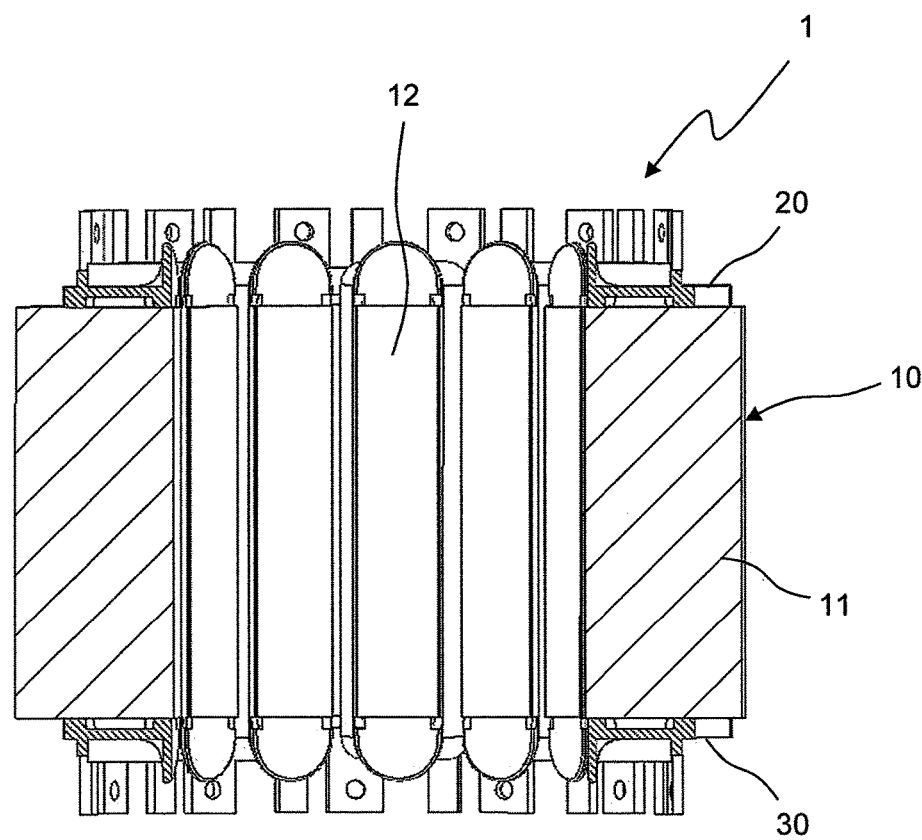
FIG. 2 is a longitudinal cross-sectional view of the stator.

FIG. 1 is a perspective view of a stator 1 of a first embodiment of the present disclosure, and FIG. 2 is a longitudinal cross-sectional view of the stator.

As illustrated in FIGS. 1 and 2, the stator 1 has a stator core 10, an upper insulator 20 mounted to an axially upper end surface of the stator core 10, a lower insulator 30 mounted to an axially lower end surface of the stator core 10, and coils U1 to U4, V1 to V4, W1 to W4 wound around the stator core 10, the upper insulator 20, and the lower insulator 30 as assembled together.

The upper insulator 20 and the lower insulator 30 are made of an insulating resin.

The stator core 10 has a back yoke 11 having an annular shape, and a plurality of teeth 12 protruding radially inward from an inner peripheral surface of the back yoke 11.

The coils U1 to U4, V1 to V4, W1 to W4 are each wound around a corresponding one of the teeth 12 rather than being distributedly wound around the teeth 12, which is a so-called concentrated winding.

Figure 3:
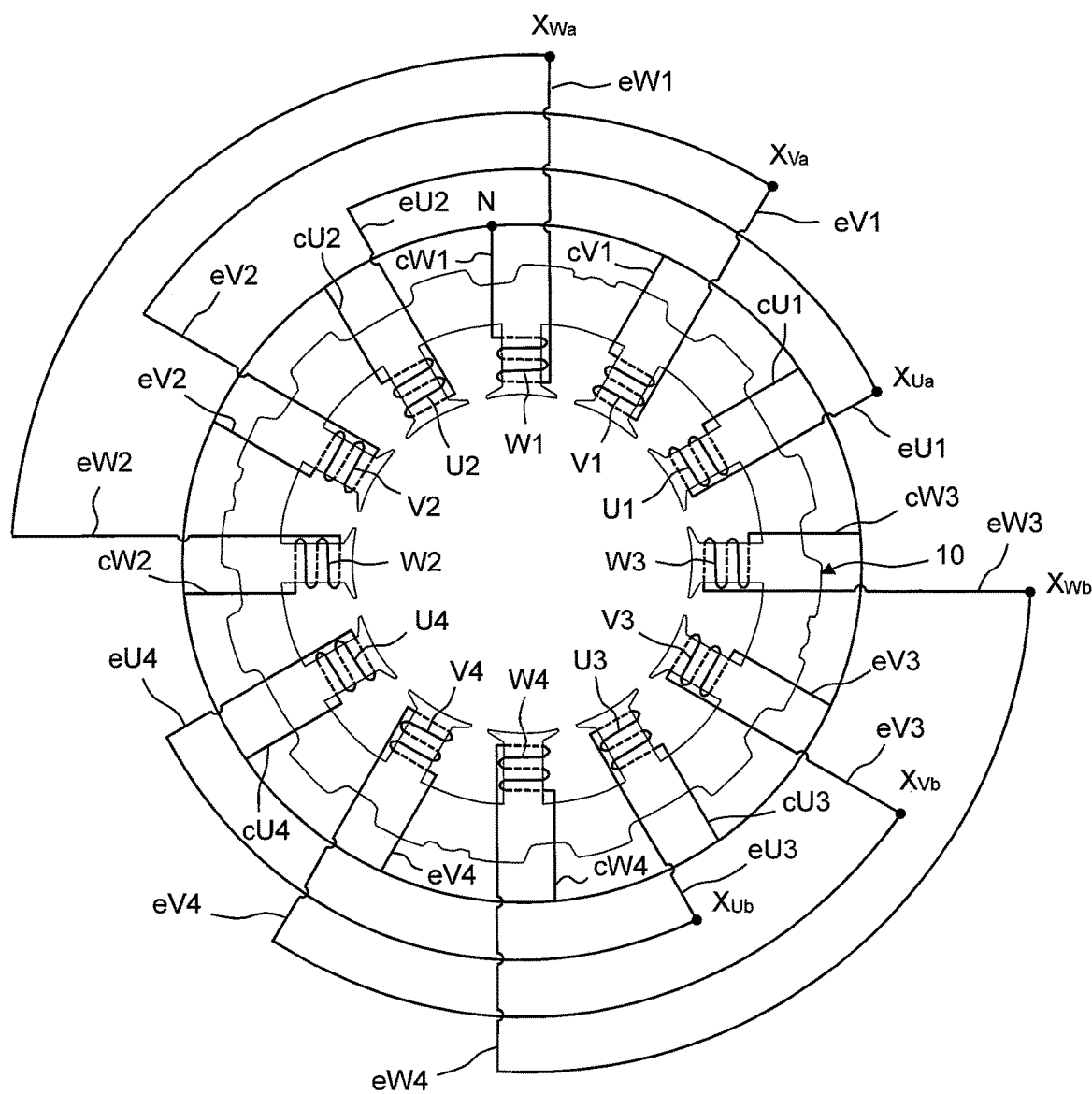
FIG. 3 is a diagram illustrating how coils of the stator are connected.
Figure 4:
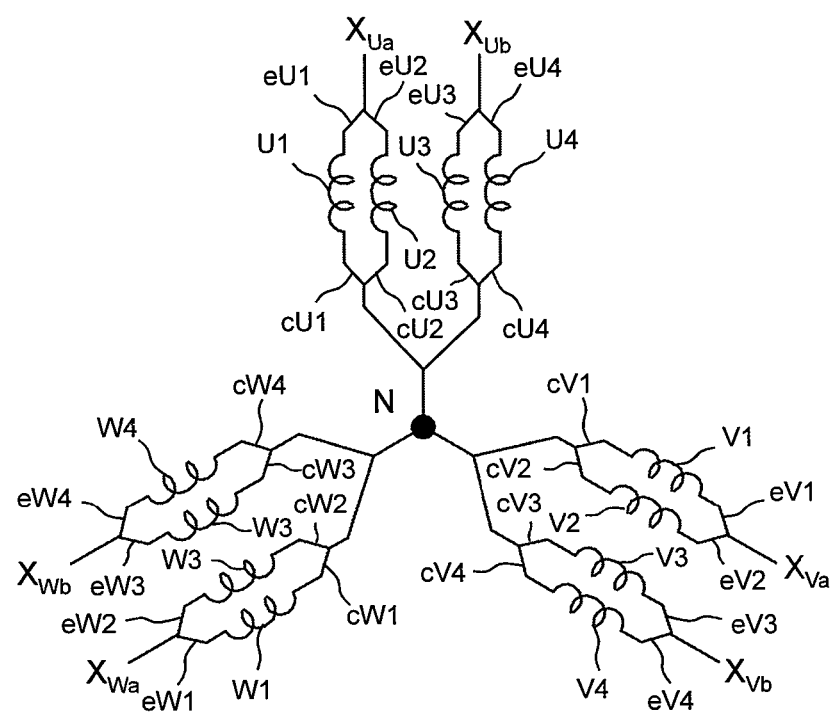
FIG. 4 is a schematic diagram illustrating how the coils illustrated in FIG. 3 are connected.

FIG. 3 is a diagram illustrating how the coils U1 to U4, V1 to V4, W1 to W4 of the stator 1 are connected, and FIG. 4 is a schematic diagram illustrating how the coils U1 to U4, V1 to V4, W1 to W4 illustrated in FIG. 3 are connected. FIG. 3 is a top view of the stator core 10 with the upper insulator 20 removed.

Twelve feeder lines eU1 to eU4, eV1 to eV4, eW1 to eW4 corresponding to winding start portions of windings of the coils U1 to U4, V1 to V4, W1 to W4, respectively, emerge from the upper end surface of the stator core 10. Twelve neutral lines cU1 to cU4, cV1 to cV4, cW1 to cW4 corresponding to winding end portions of the windings of the coils U1 to U4, V1 to V4, W1 to W4, respectively, also emerge from the upper end surface of the stator core 10.

The feeder lines eU1, eU2 extend from first ends of the windings of the coils U1, U2, respectively, to connect to a U-phase connection part $X_{Ua}$. The feeder lines eU3, eU4 extend from first ends of the windings of the coils U3, U4, respectively, to connect to a U-phase connection part $X_{Ub}$.

The feeder lines eV1, eV2 extend from first ends of the windings of the coils V1, V2, respectively, to connect to a V-phase connection part $X_{Va}$. The feeder lines eV3, eV4 extend from first ends of the windings of the coils V3, V4, respectively, to connect to a V-phase connection part $X_{Vb}$.

The feeder lines eW1, eW2 extend from first ends of the windings of the coils W1, W2, respectively, to connect to a W-phase connection part $X_{Wa}$. The feeder lines eW3, eW4 extend from first ends of the windings of the coils W3, W4, respectively, to connect to a W-phase connection part $X_{Wb}$.

The coils U1 to U4, V1 to V4, W1 to W4 are fixed by winding, so that the feeder lines eU1 to eU4, eV1 to eV4, eW1 to eW4 corresponding to the winding start portions do not loosen even without being fixed to the stator core 10.

The neutral lines cU1 to cU4 extend from second ends of the windings of the coils U1 to U4, respectively, to connect to a neutral point N. The neutral lines cV1 to cV4 extend from second ends of the windings of the coils V1 to V4, respectively, to connect to the neutral point N. The neutral lines cW1 to cW4 extend from second ends of the windings of the coils W1 to W4, respectively, to connect to the neutral point N. At the neutral point N, all the neutral lines cU1 to cU4, cV1 to cV4, cW1 to cW4 are electrically connected.

The feeder lines eU1 to eU4, eV1 to eV4, eW1 to eW4 and the neutral lines cU1 to cU4, cV1 to cV4, cW1 to cW4 are latched, or secured, to the upper insulator 20 mounted to the upper end surface of the stator core 10 so as not to be electrically connected to each other.

Figure 5:
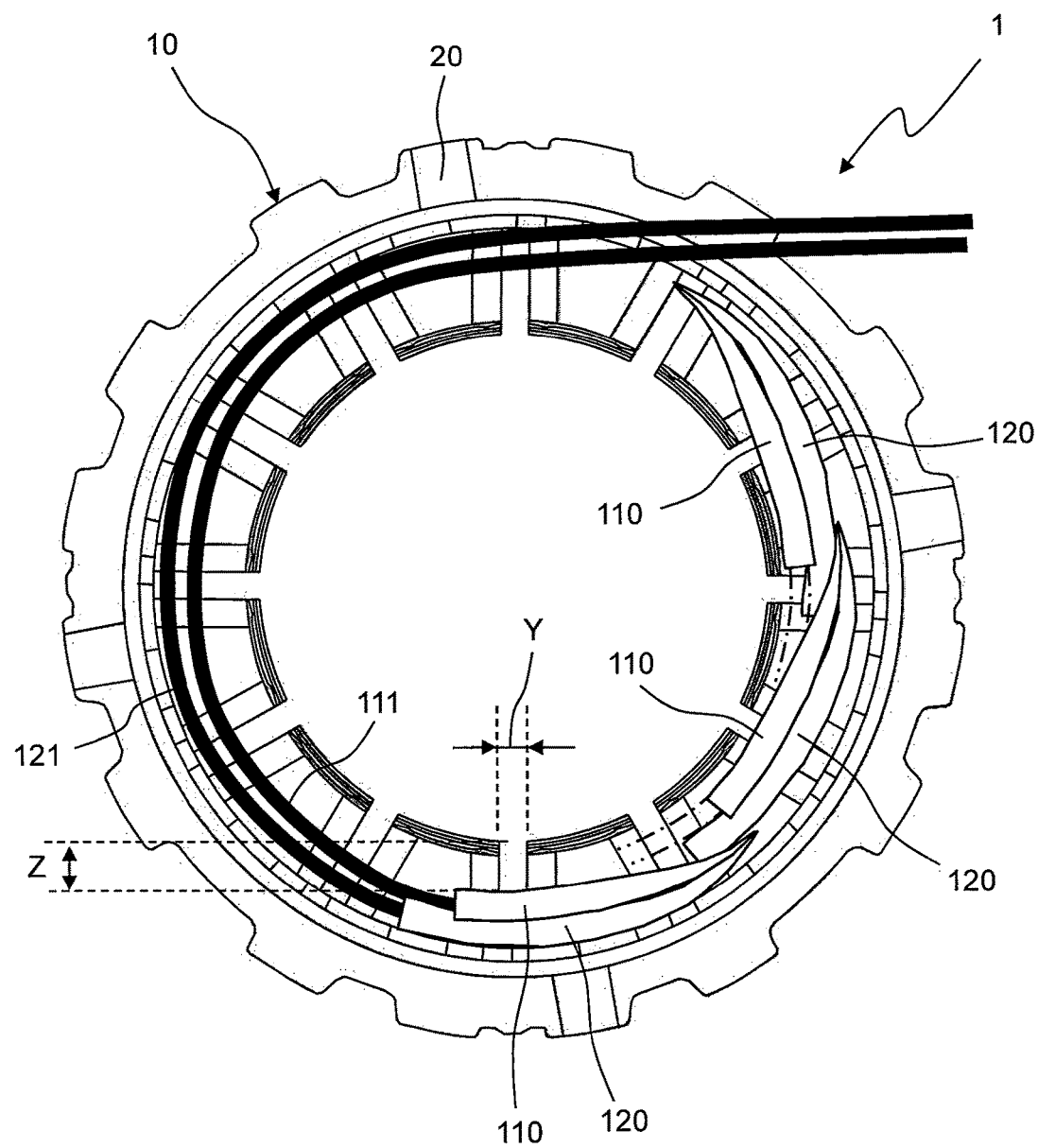
FIG. 5 is a top view of the stator.

FIG. 5 is a top view of the stator 1. As illustrated in FIG. 5, an insulating cap 110 covering one U-phase connection part $X_{Ua}$ (illustrated in FIGS. 3 and 4) and an insulating cap 120 covering the other U-phase connection part $X_{Ub}$ (illustrated in FIGS. 3 and 4) are placed on their respective coil ends with the insulating cap 110 and the insulating cap 120 shifted from each other in a circumferential direction.

Likewise, an insulating cap 110 covering one V-phase connection part and an insulating cap 120 covering the other V-phase connection part are placed on their respective coil ends with the insulating cap 110 and the insulating cap 120 shifted from each other in the circumferential direction.

Likewise, an insulating cap 110 covering one W-phase connection part and an insulating cap 120 covering the W-phase connection part are placed on their respective coil ends with the insulating cap 110 and the insulating cap 120 shifted from each other in the circumferential direction.

A lead wire 111, a lead wire 121, the insulating caps 110, the insulating caps 120, and other lead wires are fixed to the upper insulator 20 by a plurality of binding threads (not illustrated).

In FIG. 5, Y denotes a gap between adjacent ones of the coils U1 to U4, V1 to V4, W1 to W4, and Z denotes a radial length of an opening of an upward passage in the gap Y. A cross-sectional area of the passage (passage cross-sectional area) in which a flow path is formed is approximately Y*Z.

Figure 6:
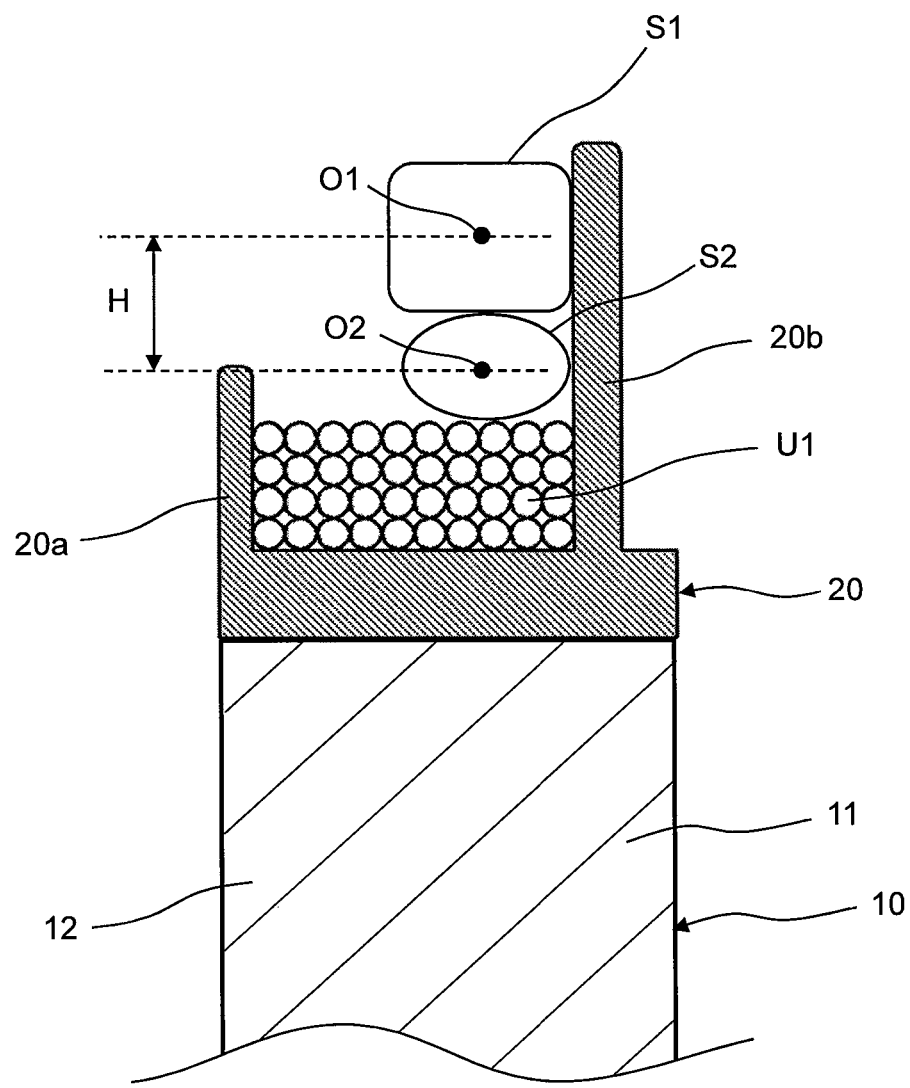
FIG. 6 is a schematic cross-sectional view of an important part of the stator.
Figure 7:
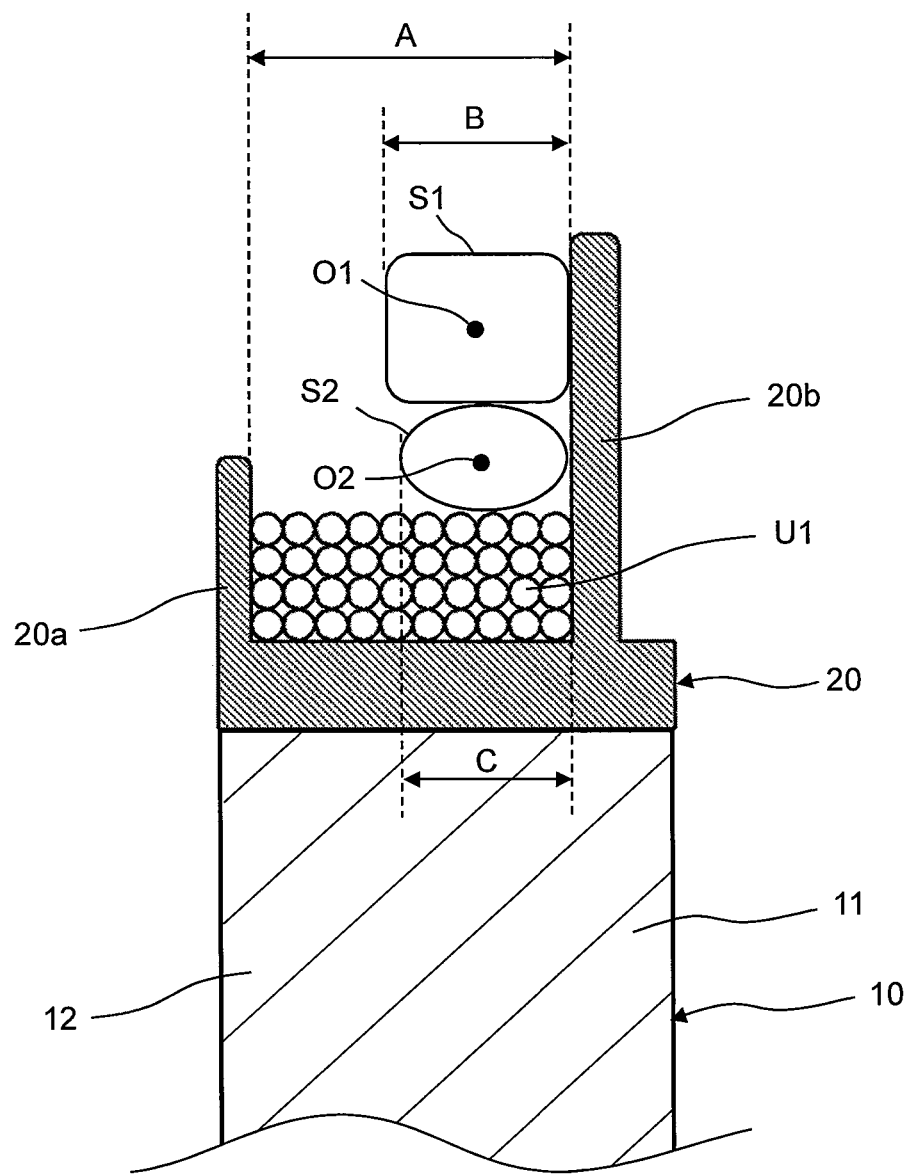
FIG. 7 is a schematic cross-sectional view of the part of the stator.

FIGS. 6 and 7 are schematic cross-sectional views of an important part of the stator 1. In FIGS. 6 and 7, the same components as those illustrated in FIGS. 1 and 2 are denoted by the same reference signs. FIGS. 6 and 7 are cross-sectional views of the coil U1 among the plurality of coils U1 to U4, V1 to V4, W1 to W4, taken along a plane including the axis of the stator core 10.

The stator 1 includes a first region S1 in which distal ends of the feeder lines eU1 to eU4, eV1 to eV4, eW1 to eW4 extending from the first ends of the plurality of coils U1 to U4, V1 to V4, W1 to W4 are connected to each other, and a second region S2 in which distal ends of the neutral lines cU1 to cU4, cV1 to cV4, cW1 to cW4 extending from the second ends of the plurality of coils U1 to U4, V1 to V4, W1 to W4 are connected to each other.

The upper insulator 20 has an inner wall 20a and an outer wall 20b provided, spaced from each other in the radial direction of the stator core 10.

In the cross section illustrated in FIG. 6, a center of gravity O1 of the first region S1 is positioned above a center of gravity O2 of the second region S2, as seen in the axial direction of the stator core 10 (first condition). In other words, in the cross section illustrated in FIG. 6, the center of gravity O2 of the second region S2 is positioned between the center of gravity O1 of the first region S1 and the stator core 10 (first condition). In the first embodiment, a difference in height between the center of gravity O1 of the first region S1 and the center of gravity O2 of the second region S2 is denoted as H. The center of gravity O1 of the first region S1 here is a center of gravity of a cross-sectional shape of the first region S1, and the center of gravity O2 of the second region S2 is a center of gravity of a cross-sectional shape of the second region S2.

In the cross section illustrated in FIG. 7, when a radial length of the first region S1 is denoted as B, a radial length of the second region S2 is denoted as C, and a radial length between the inner wall 20a and the outer wall 20b of the upper insulator 20 is denoted as A, a relationship of $$B < A, \text{ and } C < A \qquad \text{(expression 1)}$$

is satisfied (second condition).

When the stator is used in a compressor 200, as described later, satisfying the first condition and the second condition in the cross section at the gap between at least one pair of the plurality of coils U1 to U4, V1 to V4, W1 to W4, taken along the plane including the axis of the stator core 10, makes it possible to secure the passage cross-sectional area between the coils through which a refrigerant flows and thereby reduce the flow velocity of the refrigerant flowing between the coils and prevent oil from escaping through the gap between the coils.

In the first embodiment, the cross section at the gap between the pair of coils, taken along the plane including the axis of the stator core 10, satisfies the first condition and the second condition. A cross section at a gap between at least two coils, taken along a plane including the axis of the stator core 10, should satisfy the first condition and the second condition.

Alternatively, cross sections at all gaps between adjacent ones of all the coils U1 to U4, V1 to V4, W1 to W4 taken along the plane including the axis of the stator core 10 may satisfy the first condition and the second condition. This makes it possible to secure the passage cross-sectional areas between all the coils U1 to U4, V1 to V4, W1 to W4, to reduce the flow velocity of the refrigerant flowing between all the coils U1 to U4, V1 to V4, W1 to W4, and thus to prevent an outflow of the oil from the gap between the coils U1 to U4, V1 to V4, W1 to W4.

In a cross section of the stator core 10, taken along a plane including the axis of the stator core 10, at any point of the circumference of the stator core 10, the center of gravity O1 of the first region S1 may be positioned above the center of gravity O2 of the second region S2, as seen in the axial direction of the stator core 10. In other words, in a cross section of the stator core 10, taken along a plane including the axis of the stator core 10 and passing any point of the circumference of the stator core 10, the center of gravity O2 of the second region S2 may be positioned between the center of gravity O1 of the first region S1 and the stator core 10. As a result, the second region S2 having a relatively small cross-sectional shape is, as a whole, located below the first region S1 (i.e., closer to the stator core 10 than the first region S1), so that it is possible to make a space adjacent to the coil end larger, to thereby make the flow of the refrigerant smooth while making the passage cross-sectional area between the coils larger, and thus to reduce the flow velocity of the refrigerant flowing between the coils.

A lower end of the first region S1 is preferably positioned above an upper end of the second region S2, as seen in the axial direction of the stator core 10. In other words, it is preferable that an end remote from the stator core 10 of the second region S2 be positioned between the stator core 10 and an end adjacent to the stator core 10 of the first region S1. As a result, the second region S2 having a relatively small cross-sectional shape is located below the first region S1 (i.e., closer to the stator core 10 than the first region S1), so that it is possible to make the space adjacent to the coil end large, to thereby make the flow of the refrigerant smooth while making the passage cross-sectional area between the coils larger, and thus to reduce the flow velocity of the refrigerant flowing between the coils.

Next, details of the first region S1 and the second region S2 will be described.

First, in a top view of the stator 1 illustrated in FIG. 5, the lead wire 111 and the lead wire 121 are arranged on the coils U1 to U4, V1 to V4, W1 to W4 wound around each tooth 12. The first region S1 including the lead wires and the second region S2 including the neutral lines vary in configuration, depending on their positions in the circumferential direction of the stator 1.

For example, in the first region S1 at a certain position in the circumferential direction of the stator 1, the distal ends of the feeder lines eU1, eU2 (FIGS. 3 and 4) extending from the first ends of the U-phase coils U1, U2 are connected to the lead wire 111, and the distal ends of the feeder lines eU3, eU4 (FIGS. 3 and 4) extending from the first ends of the U-phase coils U3, U4 are connected to the lead wire 121.

Note that the connection part $X_{Ua}$ (FIGS. 3 and 4) where the feeder lines eU1, eU2 are connected to the lead wire 111 is covered with the insulating cap 110 having a roll shape. Note that the connection part $X_{Ub}$ (FIGS. 3 and 4) where the feeder lines eU3, eU4 are connected to the lead wire 121 is covered with the insulating cap 120 having a roll shape.

The feeder lines eU1, eU2, the feeder lines eU3, eU4, the lead wire 111, and the lead wire 121 are fixed to the upper insulator 20 by a binding thread (not illustrated).

In the second region S2, the distal ends of the neutral lines cU1, cU2 (FIGS. 3 and 4) extending from the second ends of the U-phase coils U1, U2 are connected to the distal ends of the neutral lines cU3, cU4 (FIGS. 3 and 4) extending from the second ends of the U-phase coils U3, U4.

Second Embodiment

Figure 8:
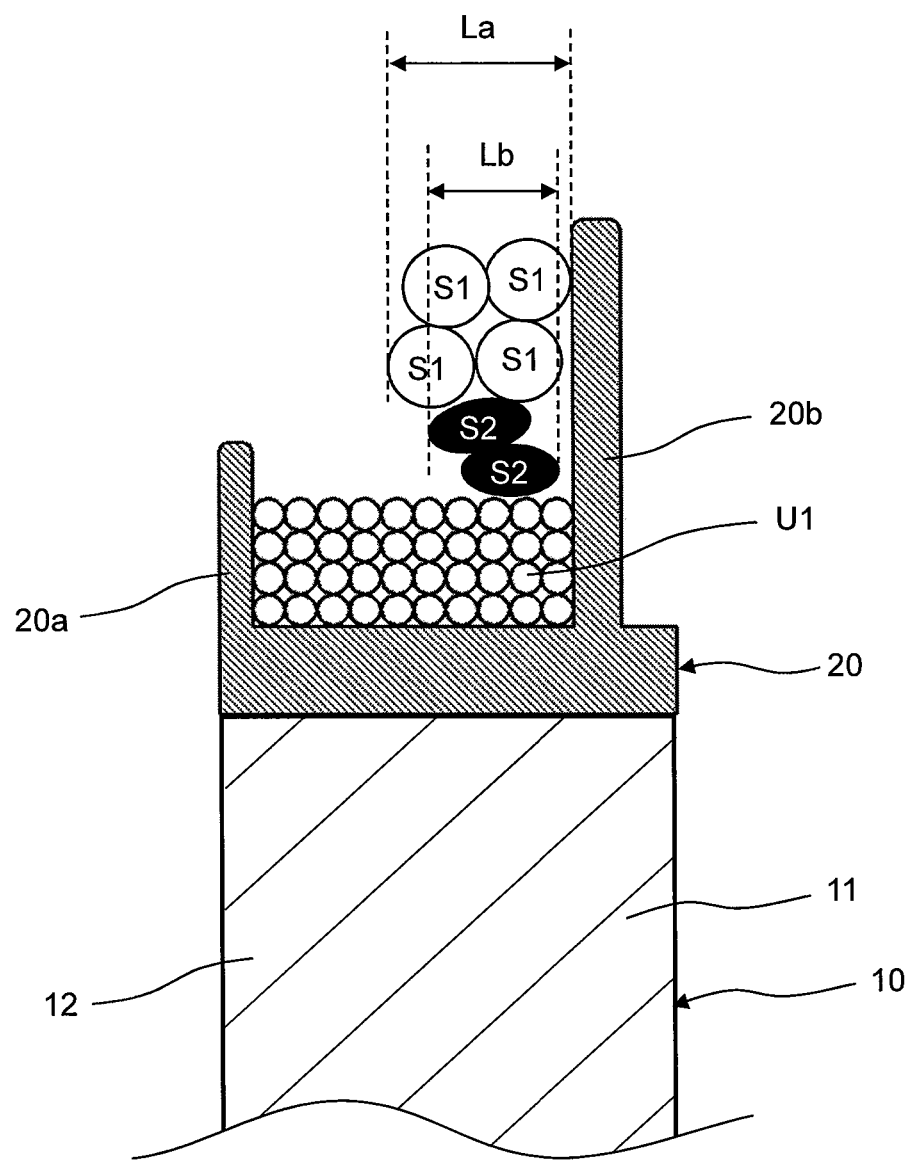
FIG. 8 is a schematic cross-sectional view of an important part of a stator of a second embodiment of the present disclosure.

FIG. 8 is a schematic cross-sectional view of an important part of a stator 1 of a second embodiment of the present disclosure. As illustrated in FIG. 8, in the cross section at the gap between adjacent ones of all the coils U1 to U4, V1 to V4, W1 to W4 taken along the plane including the axis of the stator core 10, when a radial length from a radially innermost end to a radially outermost end of an aggregation of four first regions S1 is denoted as La, and a radial length from a radially innermost end to a radially outermost end of an aggregation of two second regions S2 is denoted as Lb, a relationship of $$La > Lb \qquad \text{(expression2)}$$

is satisfied.

Satisfying the relationship of the expression 2 makes it possible to secure a passage cross-sectional area between the coils through which a refrigerant flows when the stator is used in a motor of a compressor.

The stator of the second embodiment has the same effects as the stator 1 of the first embodiment.

The present disclosure is applicable to not only the stator including the four first regions S1 and the two second regions S2 illustrated in FIG. 8, but also a stator including a plurality of first regions S1 and at least one second region S2.

Third Embodiment

Figure 9:
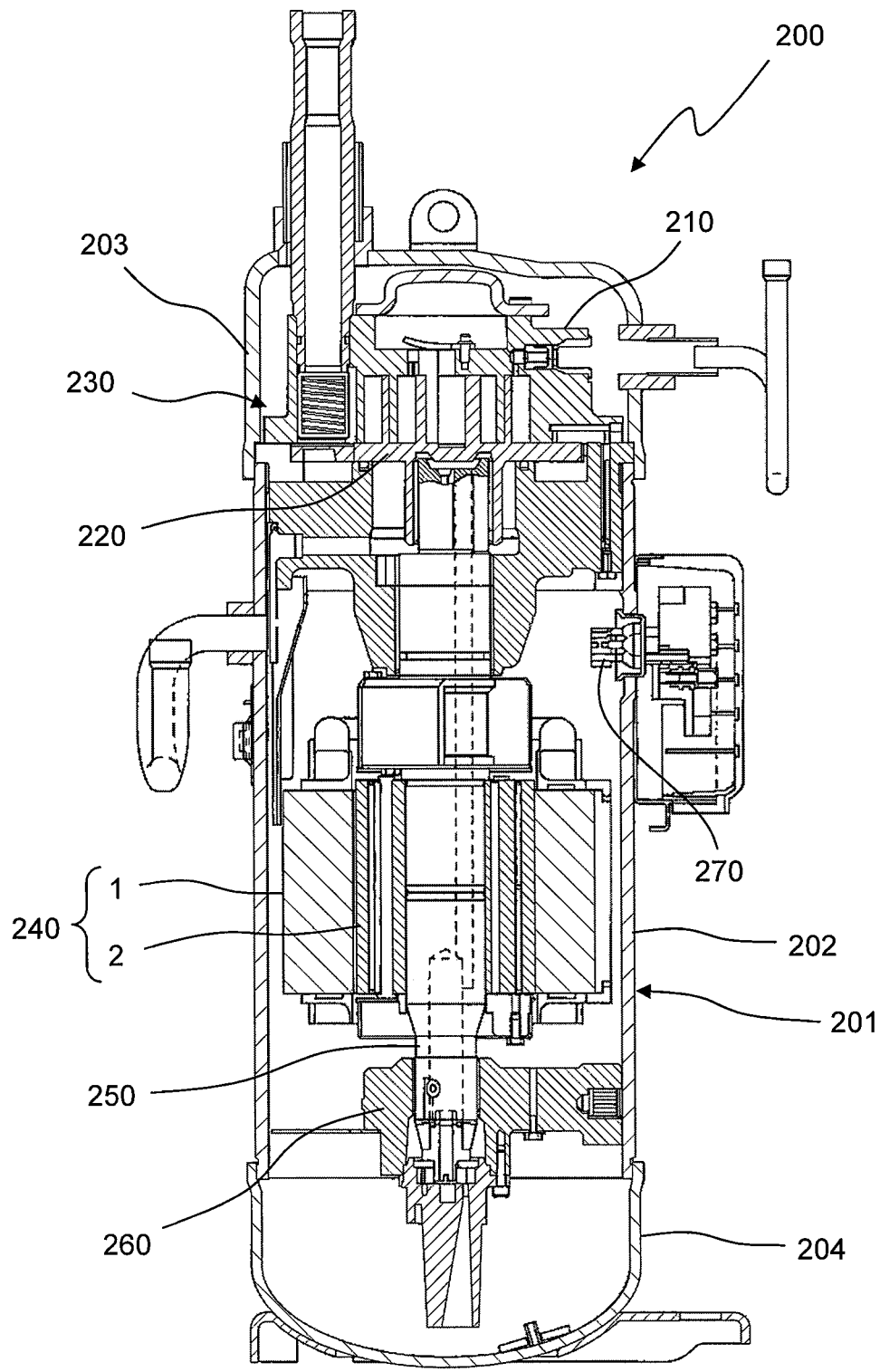
FIG. 9 is a cross-sectional view of a compressor including a motor of a third embodiment of the present disclosure.

FIG. 9 is a cross-sectional view of a compressor 200 including a motor 240 of a third embodiment of the present disclosure. This compressor is a scroll compressor.

As illustrated in FIG. 9, the compressor 200 of the third embodiment includes a hermetic container, or vessel 201, a compression mechanism part 230 including a fixed scroll 210 and a movable scroll 220, a motor 240 that drives the compression mechanism part 230, a crankshaft 250 that connects the compression mechanism part 230 to the motor 240, and a lower bearing 260 that rotatably supports a lower end of the crankshaft 250.

The hermetic container 201 includes a cylindrical member 202 that has a substantially cylindrical shape and is vertically opened, and an upper lid 203 and a lower lid 204 respectively provided at an upper end and a lower end of the cylindrical member 202.

The motor 240 includes the stator 1 of the first embodiment and a rotor 2 disposed radially inside of the stator 1. The motor 240 is of an inner rotor type and is a so-called 8-pole 12-slot motor. Note that the number of poles of the motor and the number of slots of the motor are not limited to those described above.

In the motor 240, a plurality of lead wires from the stator 1 are connected to terminals of a terminal part 270 provided on the cylindrical member 202 of the hermetic container 201.

An electromagnetic force produced in the stator 1 by applying a current to the coils U1 to U4, V1 to V4, W1 to W4 (FIGS. 3 and 4) of the stator 1 of the motor 240 causes the rotor 2 to rotate together with the crankshaft 250.

The use of the stator 1 of the first embodiment allows an increase in reliability of the motor 240 of the third embodiment. This makes the compressor 200 highly reliable.

In the third embodiment, the scroll compressor has been described. Alternatively, the motor of the present disclosure may be applied to a compressor having another configuration such as a rotary compressor.

In the first to third embodiments, the stator in which a three-phase AC voltage is applied to the coils has been described. Alternatively, the present disclosure may be applied to stators in which a two-phase or four- or more phase AC voltage is applied to the coils.

Although specific embodiments of the present disclosure have been described, the present disclosure is not limited to the first to third embodiments, and various modifications can be made within the scope of the present disclosure.

The invention claimed is:

1. A stator for a motor installed within in a hermetic container of a compressor, the stator comprising:
a stator core having a plurality of teeth;
an insulator mounted to an axial end surface of the stator core;
a plurality of coils with each coil wound around a corresponding one of the plurality of teeth of the stator core;
a first region in which a distal end of a feeder line extending from a first end of one of the coils is connected to a distal end of a feeder line extending from a first end of an other one of the coils; and
a second region in which distal ends of neutral lines extending from second ends of the coils are connected to each other,
the insulator having an inner wall and an outer wall spaced from each other in a radial direction of the stator core,
both the first region and the second region being partially disposed axially above the stator core between the inner wall and the outer wall of the insulator,
in a cross section at a gap between at least two adjacent coils of the plurality of coils, taken along a plane including an axis of the stator core, a center of gravity of the first region is positioned above a center of gravity of the second region in an axial direction of the stator core, and
B<A and C<A, where
a radial length of the first region is B,
a radial length of the second region is C, and
a radial length between the inner wall and the outer wall of the insulator is A.

2. The stator according to claim 1, wherein
in cross sections at gaps between all the coils taken along respective planes including the axis of the stator core, the center of gravity of the first region is positioned above the center of gravity of the second region in the axial direction of the stator core.

3. The stator according to claim 1, wherein
in a cross section of the stator core taken along a plane including the axis of the stator core and passing any point of a circumference of the stator core, the center of gravity of the first region is positioned above the center of gravity of the second region in the axial direction of the stator core.

4. The stator according to claim 1, wherein
a lower end of the first region is positioned above an upper end of the second region in the axial direction of the stator core.

5. The stator according to claim 1, wherein
the stator includes a plurality of first regions, and one or more second regions, and
in cross sections at gaps between all the coils taken along respective planes including the axis of the stator core, La>Lb, where
a radial length from a radially innermost end to a radially outermost end of the plurality of first regions is La, and
a radial length from a radially innermost end to a radially outermost end of the one or more second regions is Lb.

6. A motor including the stator according to claim 1, the motor further comprising:
a rotor disposed radially inside of the stator.

7. A compressor including the motor according to claim 6, the compressor further comprising:
a hermetic container; and
a compression mechanism part disposed in the hermetic container,
the motor being disposed in the hermetic container and being configured to drive the compression mechanism part.

* * * * *